US012319072B2

(12) United States Patent
Mukoyama et al.

(10) Patent No.: US 12,319,072 B2
(45) Date of Patent: Jun. 3, 2025

(54) RECORDING APPARATUS

(71) Applicant: CANON KABUSHIKI KAISHA, Tokyo (JP)

(72) Inventors: Yumi Mukoyama, Tokyo (JP); Masaaki Matsuura, Kanagawa (JP); Noriyuki Sugiyama, Kanagawa (JP); Motoyuki Taguchi, Tokyo (JP); Junichi Kubokawa, Nagasaki (JP); Yasunori Matsumoto, Kanagawa (JP); Kyosuke Kamishima, Kanagawa (JP); Takahiro Kiuchi, Tokyo (JP); Keisei Hakamata, Tokyo (JP); Haruo Uchida, Kanagawa (JP); Shoichi Kan, Kanagawa (JP); Takaaki Ishida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 18/177,654

(22) Filed: Mar. 2, 2023

(65) Prior Publication Data

US 2023/0302831 A1 Sep. 28, 2023

(30) Foreign Application Priority Data

Mar. 23, 2022 (JP) ................................ 2022-047588

(51) Int. Cl.

| | |
|---|---|
| ***B41J 27/12*** | (2006.01) |
| ***B41J 2/045*** | (2006.01) |
| ***B41J 3/60*** | (2006.01) |
| ***B41J 11/44*** | (2006.01) |
| ***B41J 29/02*** | (2006.01) |

(52) U.S. Cl.
CPC ............ *B41J 27/12* (2013.01); *B41J 2/0455* (2013.01); *B41J 3/60* (2013.01); *B41J 11/44* (2013.01); *B41J 29/02* (2013.01)

(58) Field of Classification Search
CPC ... B41J 27/12; B41J 2/0455; B41J 3/60; B41J 11/44; B41J 29/02; B41J 19/207
See application file for complete search history.

(56) References Cited

U.S. PATENT DOCUMENTS

2019/0193426 A1 * 6/2019 Mizushima ........ B41J 11/00242

FOREIGN PATENT DOCUMENTS

JP 2016064894 A 4/2016

* cited by examiner

*Primary Examiner* — Justin Seo
*Assistant Examiner* — Tracey M McMillion
(74) *Attorney, Agent, or Firm* — Canon U.S.A., Inc. I.P. Division

(57) ABSTRACT

A recording apparatus to record an image on a sheet includes a roller pair and a switching unit. The roller pair sandwiches the sheet between the roller pair to convey the sheet. The switching unit switches between a first state in which the roller pair sandwiches the sheet and a second state in which rollers of the roller pair are separated from each other. The switching unit includes a first movable member that is moved in a first direction so that the first state is switched to the second state, and includes a second movable member that is moved in a second direction different from the first direction so that the first state is switched to the second state.

9 Claims, 10 Drawing Sheets

RECORDING APPARATUS

BACKGROUND

Field

The present disclosure relates to a recording apparatus to record an image on a sheet conveyed.

Description of the Related Art

In a recording apparatus for recording an image on a sheet, a sheet conveyed and jammed in a conveyance path is to be removed. In Japanese Patent Application Laid-Open No. 2016-064894, a recording apparatus capable of recording an image on a front face of a sheet conveyed from a loading unit for loading sheets through a conveyance path and on a back face of the sheet, which has been flipped over via a conveyance path, is discussed. If a sheet is jammed in a conveyance path in this recording apparatus, a user separates rollers of a conveyance roller pair from each other with a slide member to remove the sheet.

In the configuration discussed in Japanese Patent Application Laid-Open No. 2016-064894, however, the slide member is operated irrespective of the position, in the conveyance path, of the sheet jammed in the conveyance path. In this apparatus, a sheet is hard to remove with the slide member if the sheet is in a reverse path for reversing sheets. Thus, a mechanism for separating the rollers of the conveyance roller pair from each other is in need of further improvement.

SUMMARY

The present disclosure is directed to a recording apparatus that uses multiple members to separate rollers of a roller pair from each other.

According to an aspect of the present disclosure, a recording apparatus configured to record an image on a sheet includes a roller pair configured to sandwich the sheet between the roller pair to convey the sheet, and a switching unit configured to switch between a first state in which the roller pair sandwiches the sheet and a second state in which rollers of the roller pair are separated from each other, wherein the switching unit includes a first movable member configured to be moved in a first direction so that the first state is switched to the second state, and a second movable member configured to be moved in a second direction different from the first direction so that the first state is switched to the second state.

Further features of the present disclosure will become apparent from the following description of exemplary embodiments with reference to the attached drawings.

DESCRIPTION OF THE EMBODIMENTS

An exemplary embodiment of the present disclosure will be described with reference to the accompanying drawings. The exemplary embodiment described below is not intended to limit the present disclosure, and not all combinations of features described in the present exemplary embodiment are always essential for a solution described in the present exemplary embodiment. The same components are described with the same reference signs assigned. Relative arrangements, shapes, and the like of components described in the present exemplary embodiment are each merely an example, and the scope of the present disclosure is not intended to be limited to such examples.

<Recording Apparatus>

Figure 1:
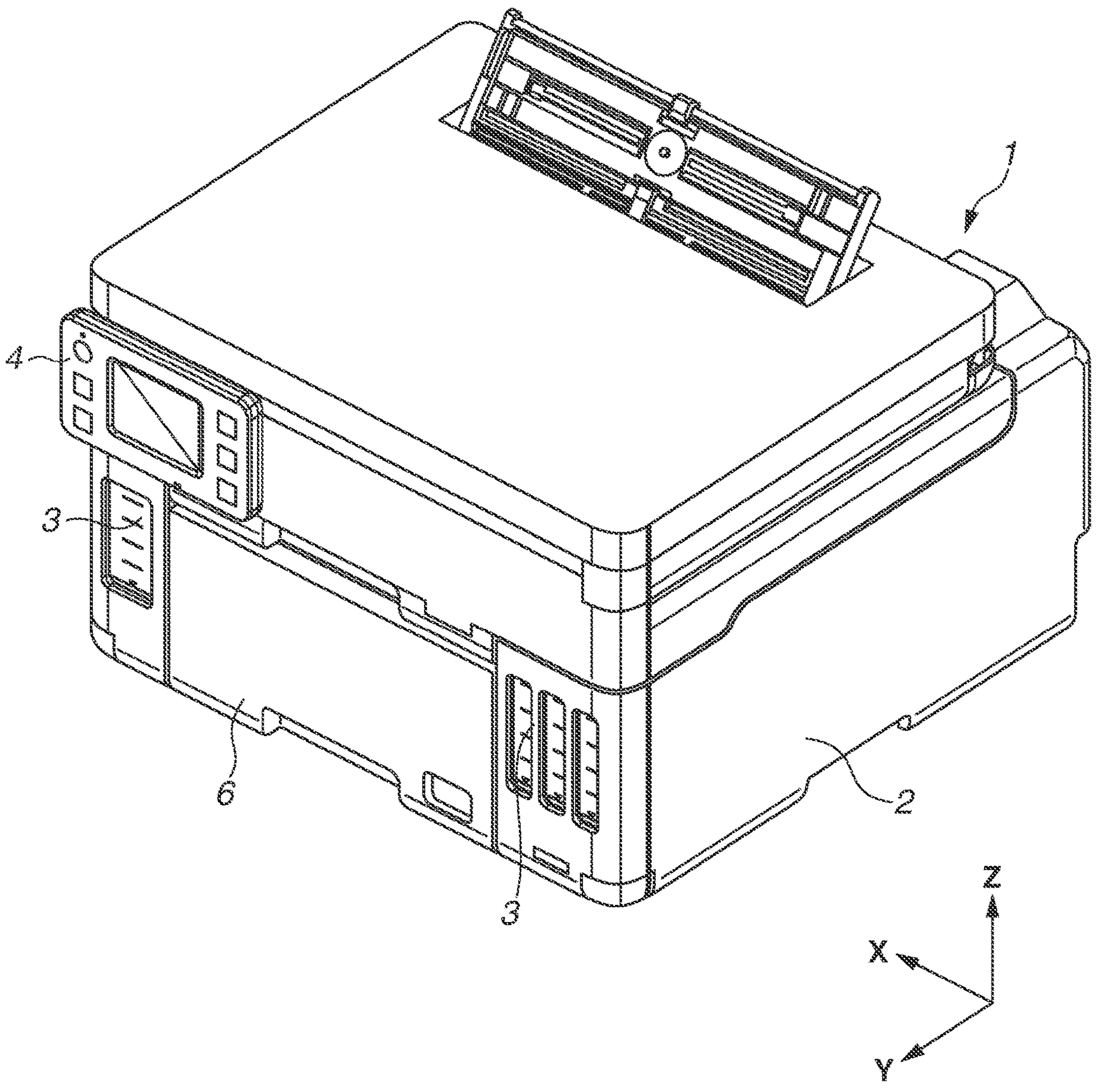
FIG. 1 is an external view of a recording apparatus.
Figure 2:
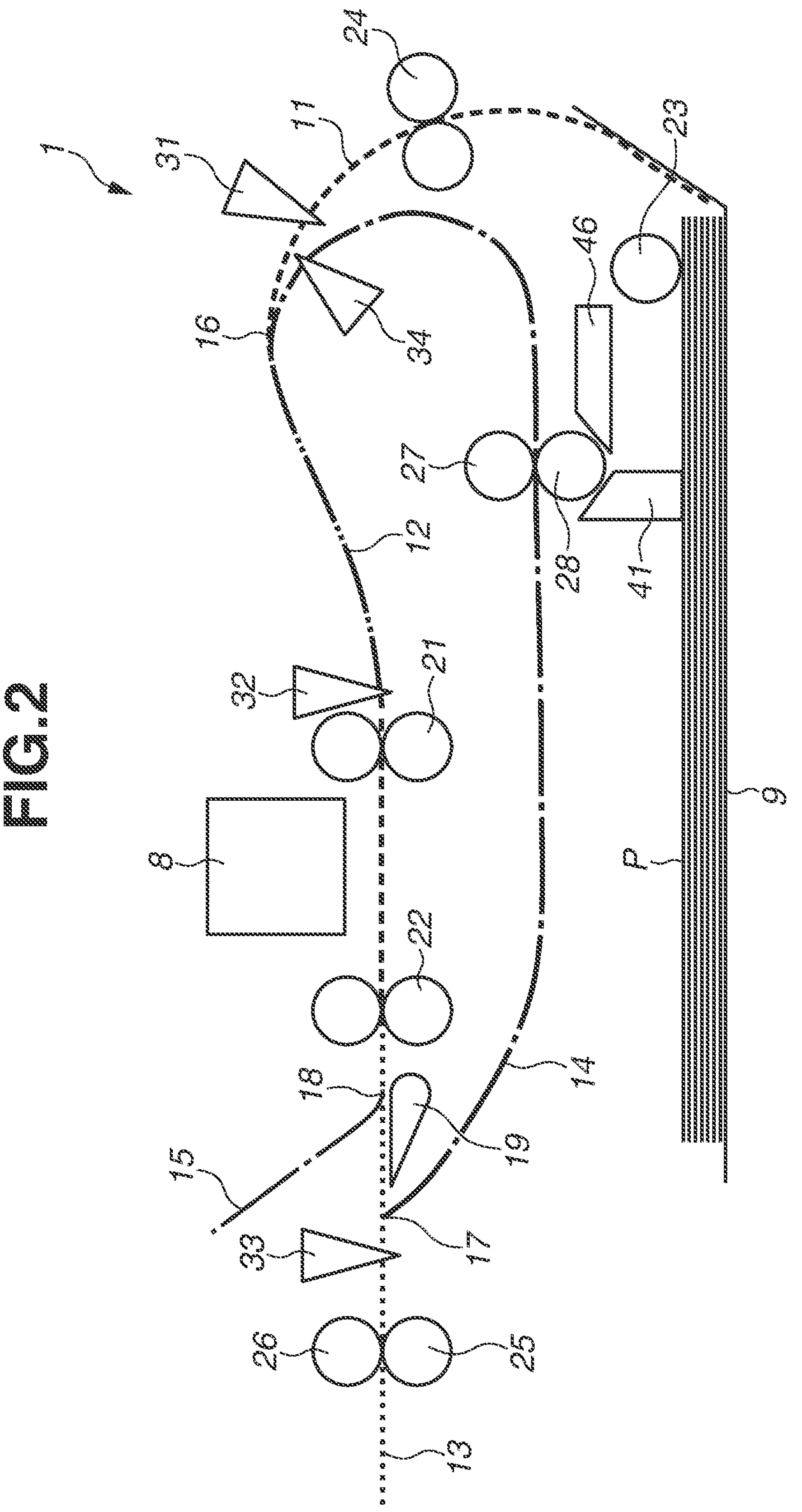
FIG. 2 is a sectional view illustrating conveyance paths for sheets in the recording apparatus.
Figure 3:
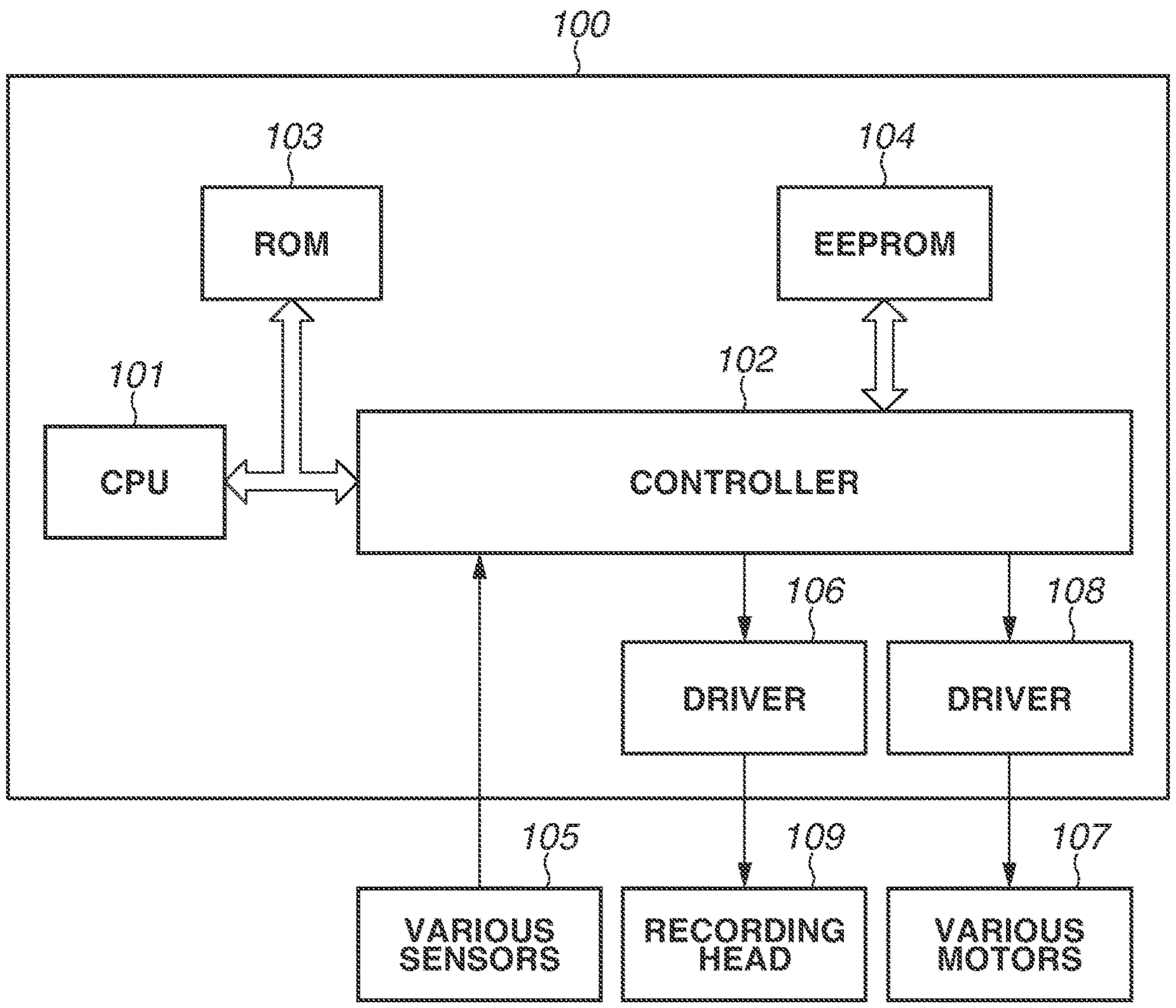
FIG. 3 is a block diagram of a control section.

A recording apparatus 1 according to the exemplary embodiment of the present disclosure is described with reference to FIGS. 1 to 3. FIG. 1 is an external view of the recording apparatus 1 according to the exemplary embodiment of the present disclosure. FIG. 2 is a sectional view illustrating conveyance paths for sheets in the recording apparatus 1. FIG. 3 is a block diagram of a control section 100 that controls the recording apparatus 1.

The recording apparatus 1 is a rectangular-parallelepiped in general. A display device 4 of a touch panel type for receiving an operation by the user is provided on the front of a case 2 forming an outer appearance of the recording apparatus 1. Arrows X, Y, and Z in FIG. 1 indicate a width direction, a depth direction, and a height direction of the recording apparatus 1, respectively, with the directions intersecting one another (the directions orthogonal to one another in the illustrated example).

The recording apparatus 1 according to the exemplary embodiment of the present disclosure is an inkjet recording apparatus that ejects ink with a recording head serving as a recording means, to a sheet to record an image. The present exemplary embodiment is applicable to an electrophotographic recording apparatus or a recording apparatus of a line head type. The term “record” herein includes not only formation of meaningful information, such as characters and figures, but extensive formation of an image, a design, a pattern, and the like on a sheet, irrespective of whether to be meaningful or meaningless. It is not questioned whether the recorded object is actualized to be visible to a human being. In the present exemplary embodiment, paper in a sheet form is assumed to be a “recording medium”, while the recording medium may be cloth, a plastic film, or the like.

The recording apparatus 1 includes a loading unit 9 for loading a sheet P, in a bottom portion of the case 2. A conveyance path for conveying the sheet P loaded on the loading unit 9 to a recording unit 8 includes a feed path 11 and a conveyance path 12.

The feed path 11 extends from the loading unit 9 to a junction 16, where second feeding rollers 24 and a first sensor 31 are provided. The conveyance path 12 extends from the junction 16 to main conveyance rollers 21, where a second sensor 32 is provided. The sheet P is conveyed through the conveyance path 12 in a conveyance direction. The main conveyance rollers 21 are a roller pair including a driving roller and a driven roller. The recording unit 8 includes a platen serving as a partial conveyance path to support the sheet P, a recording head 109, and a carriage for moving the recording head 109. To the recording head 109, ink is fed from an ink tank 3.

A conveyance path for conveying the sheet P, on which an image has been recorded in the recording unit 8, includes a conveyance path 13, a reverse path 14, and a discharge path 15. The conveyance path 13 extends downstream in the conveyance direction of discharge rollers 22. The discharge rollers 22 is a roller pair including a driving roller and a driven roller. The conveyance path 13 includes a discharge branch portion 18 and a reverse branch portion 17. The discharge path 15 is used for conveying the sheet P from the discharge branch portion 18 in the conveyance path 13 to a discharge section. The reverse path 14 includes a fourth sensor 34 and an intermediate roller pair including an intermediate roller 27 and a driven roller 28. The reverse path 14 connects the junction 16 in the conveyance path 12 and the reverse branch portion 17 in the conveyance path 13 to each other. The sheet P is flipped over by passing through the reverse path 14, and then returns to the recording unit 8. A direction in which the sheet P is conveyed in the reverse path 14 is referred to as a reverse direction.

The sheet P is fed from the loading unit 9 to the feed path 11 by a first feeding roller 23, then conveyed to the conveyance path 12 by the second feeding rollers 24 provided in the feed path 11. The sheet P that has been conveyed to the conveyance path 12 is conveyed by the main conveyance rollers 21 to the recording unit 8. In the recording unit 8, a recording operation of alternately performing an ejection operation and a conveyance operation is performed to record an image on the sheet P. More specifically, in the recording operation, the recording head 109 is caused to reciprocate in the X direction while ejecting ink. In the conveyance operation, the sheet P is conveyed by the main conveyance rollers 21 in the conveyance direction. The sheet P on which the image has been recorded is conveyed by the main conveyance rollers 21 and the discharge rollers 22 to the conveyance path 13 or the discharge path 15 on a downstream side in the conveyance direction of the recording unit 8. A path changer 19 is provided between the discharge branch portion 18 and the reverse branch portion 17. The path changer 19 is capable of changing a conveyance path for the sheet P to the conveyance path 13, in which a reverse roller 25 is provided, or the discharge path 15.

In double-sided recording to perform recording on a front face and a back face of a sheet, the sheet P that has been conveyed to the conveyance path 13 is conveyed to the reverse path 14 by the reverse roller 25. At this time, the path changer 19 changes the conveyance path for the sheet P so that the sheet P is guided to the reverse path 14. The sheet P that has been conveyed to the reverse path 14 is conveyed to the conveyance path 12 by the intermediate roller 27 provided in the reverse path 14, and further conveyed to the recording unit 8 by the main conveyance rollers 21. The sum of the length of the conveyance path 12 and the length of the reverse path 14 is substantially the same as the length of the largest sheet.

The recording apparatus 1 includes multiple drive sources for driving the first feeding roller 23, the second feeding rollers 24, the main conveyance rollers 21, the discharge rollers 22, the reverse roller 25, and the intermediate roller 27. The respective rollers are rotated by the drive sources in a forward direction for conveyance from the main conveyance rollers 21 toward the discharge rollers 22 in the conveyance direction, and a direction opposite to the forward direction, thus conveying the sheet P.

The first feeding roller 23 and the second feeding rollers 24 are driven by one and the same drive source, and drive transmission for the first feeding roller 23 is blocked when the sheet P reaches the second feeding rollers 24. A tooth lacking gear, a clutch mechanism or the like is used for a configuration where the drive transmission is blocked. The main conveyance rollers 21 and the discharge rollers 22 are driven by one and the same drive source, while the reverse roller 25 and the intermediate roller 27 each have a drive source capable of driving individually.

The control section 100 is a control circuit for controlling operations of the respective mechanisms of the recording apparatus 1. A central processing unit (CPU) 101 controls the entire recording apparatus 1. A controller 102 assists the CPU 101 to control various motors 107 and the recording head 109 according to results of detections by various sensors 105. A read-only memory (ROM) 103 stores various types of data, control programs of the CPU 101, and the like. An electrically erasable, programmable read-only memory (EEPROM) 104 stores various types of data, and the like. The ROM 103 and the EEPROM 104 may be other storing devices. A driver 106 drives ink ejecting elements of the recording head 109, and a driver 108 drives the various motors 107. The various motors 107 include the drive sources of the respective rollers.

The various sensors 105 include an encoder that detects the position of the carriage, a rotary encoder that detects the amount of rotation of the main conveyance rollers 21, and a sheet sensor that detects a forward end or a rearward end of the sheet P in the conveyance path for the sheet P. The sheet sensor includes the first sensor 31, the second sensor 32, a third sensor 33, and the fourth sensor 34. The timing of feed or conveyance of the sheet P is determined according to a result of detection by the sheet sensor provided in a conveyance path. Each drive source starts or stops driving based on a result of detection by the sheet sensor. The recording operation is started in a case where a recording job is received from a host computer or a recording job of recording an original document read by a reader on a sheet is generated, for instance.

<Control of Conveyance>

The control of conveyance of the sheet P is now described below. The description is provided of the control of conveyance in a case where recording is sequentially performed on one side of each of multiple sheets, in a case where recording is performed on both sides of one sheet, and in the case where recording is sequentially performed on both sides of each of multiple sheets.

A method for conveying the sheet P in the case where recording is sequentially performed on one side of each of multiple sheets is initially described. The sheet P that is fed first is referred to as a preceding sheet (first sheet) P1, and the sheet P that is fed after the preceding sheet P1 is referred to as a succeeding sheet (second sheet) P2. The preceding sheet P1 fed from the loading unit 9 is conveyed to the feed path 11, then to the conveyance path 12, and reaches the recording unit 8. After an image is recorded on a first face which is a front face of the preceding sheet P1, in the recording unit 8, the preceding sheet P1 is discharged through the discharge path 15. In such a process, the succeeding sheet P2 is fed from the loading unit 9 when the preceding sheet P1 with rearward end having been detected by the first sensor 31 in the feed path 11, is conveyed to a specified extent. The succeeding sheet P2 that has been fed is discharged through the discharge path 15 after an image is recorded on a first face which is a front face of the succeeding sheet P2, in the recording unit 8. A conveyance operation of conveying a sheet and a recording operation of recording an image on a sheet are repeated, thus performing single-sided recording on multiple sheets.

Next, a method of conveying the sheet P in the case where an image is recorded on both sides of one sheet is described. The sheet P fed from the loading unit 9 is conveyed to the feed path 11, then to the conveyance path 12, and reaches the recording unit 8. After an image is recorded on a first face which is a front face of the sheet P in the recording unit 8, the sheet P is conveyed to the conveyance path 13. After the rearward end in the conveyance direction of the sheet P is detected by the third sensor 33 provided in the conveyance path 13, the sheet P is conveyed to the reverse path 14 by a drive direction of the reverse roller 25 being changed. The sheet P with the image recorded on the front face is conveyed from the reverse path 14 to the conveyance path 12 and reaches the recording unit 8. An image is then recorded on a second face which is a back face of the sheet P, in the recording unit 8. Subsequently, the sheet P is conveyed to the discharge path 15.

Figure 4A:
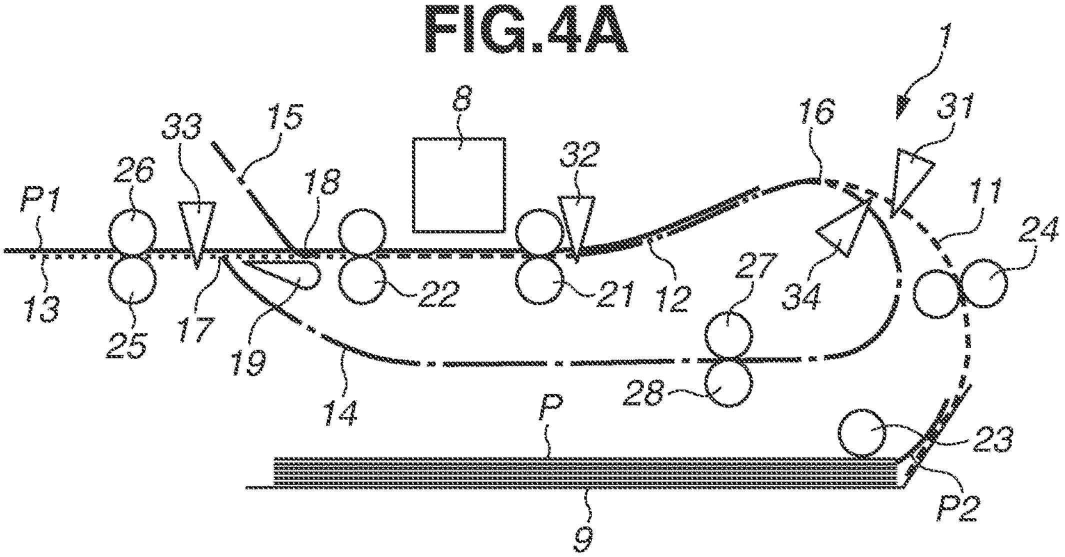
FIGS. 4A to 4C are diagrams illustrating conveyance of multiple sheets during double-sided recording on the sheets.
Figure 4B:
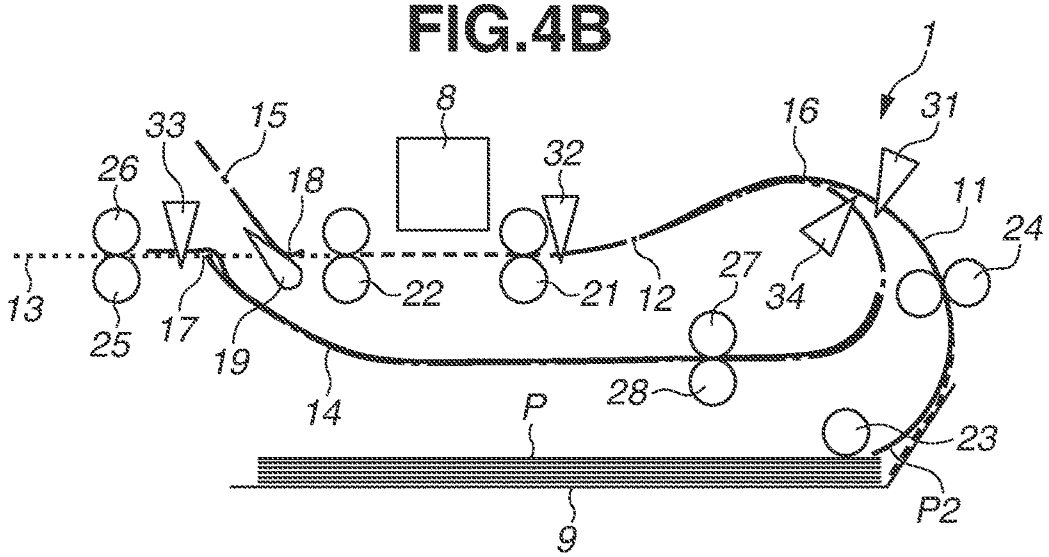
Figure 4C:
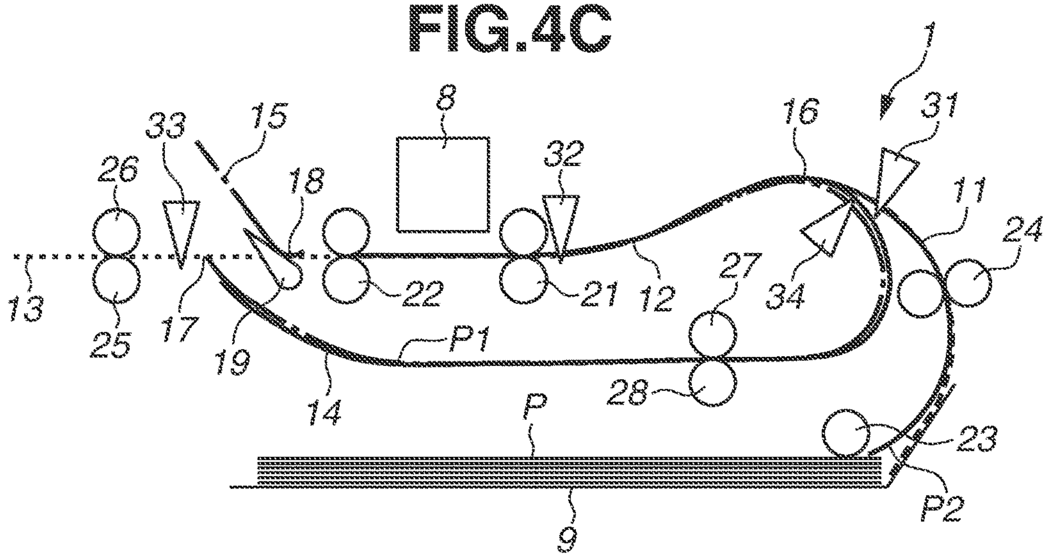

A description will now be provided of a method of conveying the sheet P in the case where an image is sequentially recorded on both sides of each of multiple sheets. FIGS. 4A to 4C illustrate conveyance of multiple sheets during the double-sided recording on the sheets. The first sheet P1, the second sheet P2, and a third sheet P3 are conveyed in this order. The first sheet P1 fed from the loading unit 9 is conveyed to the feed path 11, then to the conveyance path 12, and reaches the recording unit 8. An image is recorded on the first face serving as the front face of the first sheet P1 in the recording unit 8, and then the first sheet P1 is conveyed to the conveyance path 13. In this process, the second sheet P2 is fed from the loading unit 9 when, after the rearward end of the first sheet P1 has been detected by the first sensor 31 provided in the feed path 11, the first sheep P is conveyed to a specified extent (FIG. 4A). The forward end of the second sheet P2 is detected by the first sensor 31. Subsequently, the second sheet P2 is conveyed to a specified extent and then stopped in the conveyance path 12. Meanwhile, after the rearward end in the conveyance direction of the first sheet P1 is detected by the third sensor 33 in the conveyance path 13, the first sheet P1 is conveyed to the reverse path 14 by the drive direction of the reverse roller 25 being changed (FIG. 4B). In this process, the first sheet P1 is conveyed from the conveyance path 13 toward the reverse path 14, and the forward end of the first sheet P1 is detected by the third sensor 33. Thereafter, the first sheet P1 is conveyed in the reverse path 14 to a specified extent and then the second sheet P2 that has been stopped in the conveyance path 12 is conveyed to the recording unit 8 (FIG. 4C). After the forward end of the first sheet P1 is detected by the fourth sensor 34 provided in the reverse path 14, the first sheet P1 is conveyed to a specified extent and stopped in the conveyance path 12. At this time, the second sheet P2 to be subjected to recording in the recording unit 8 and to be conveyed to the conveyance path 13 overlaps the first sheet P1 in a region on an upstream side of the second sensor 32 provided in the conveyance path 12 extending from the junction 16.

The first sheet P1 is stopped in the conveyance path 12 until the recording of an image on the first face of the second sheet P2 is completed.

The recording of an image on the second sheet P2 progresses, and a rearward end in the conveyance direction of the second sheet P2 is detected by the second sensor 32. Thereafter, the second sheet P2 is conveyed to a specified extent and then the first sheet P1 which has been stopped, is conveyed to the recording unit 8. After an image is recorded on a second face which is the back side of the first face of the first sheet P1 in the recording unit 8, the first sheet P1 is conveyed to the discharge path 15. Meanwhile, the second sheet P2 with the rearward end in the conveyance direction of the second sheet P2 detected by the third sensor 33 is conveyed to the reverse path 14 by the drive direction of the reverse roller 25 being changed. In this process, the first sheet P1 is conveyed to a specified extent after the rearward end in the conveyance direction of the first sheet P1 is detected by the second sensor 32. At this time, the third sheet P3 is fed from the loading unit 9. The third sheet P3 is conveyed to the feed path 11, then to the conveyance path 12, and reaches the recording unit 8. A first face which is a front face of the third sheet P3 is subjected to recording in the recording unit 8, and the third sheet P3 is conveyed to the conveyance path 13. The second sheet P2 is conveyed from the reverse path 14 to the conveyance path 12, and a forward end in the reverse direction of the second sheet P2 is detected by the fourth sensor 34. Thereafter, the second sheet P2 that has been conveyed to a specified extent is stopped in the conveyance path 12. In this process, the third sheet P3 and the second sheet P2 overlap each other in a region on the upstream side of the second sensor 32 provided in the conveyance path 12, which extends from the junction 16.

After a rearward end in the conveyance direction of the third sheet P3 is detected by the second sensor 32, the third sheet P3 is conveyed to a specified extent. Here, the second sheet P2 that has been stopped is conveyed to the recording unit 8 and an image is recorded on the second face of the second sheet P2 in the recording unit 8. The second sheet P2 is then conveyed to the discharge path 15. The third sheet P3 A with the rearward end thereof detected by the third sensor 33 is conveyed to the reverse path 14 by the drive direction of the reverse roller 25 being changed. Thereafter, the third sheet P3 is conveyed from the reverse path 14 to the conveyance path 12, then to the recording unit 8, and an image is recorded on the second face of the third sheet P3 in the recording unit 8. The third sheet P3 is then conveyed to the discharge path 15.

Normally, the third sheet P3 having the first face to be subjected to recording is conveyed to the conveyance path 12 before the conveyance of the second sheet P2 having the second face to be subjected to recording. The second sheet P2 having the second face to be subjected to recording, however, may be conveyed to the conveyance path 12 before the third sheet P3 having the first face to be subjected to recording, in cases where the density of an image to be recorded is high, where the temperature of the drive sources has moved up, and where the third sheet P3 will be fed late.

<Disposal of Jammed Sheet>

Figure 5:
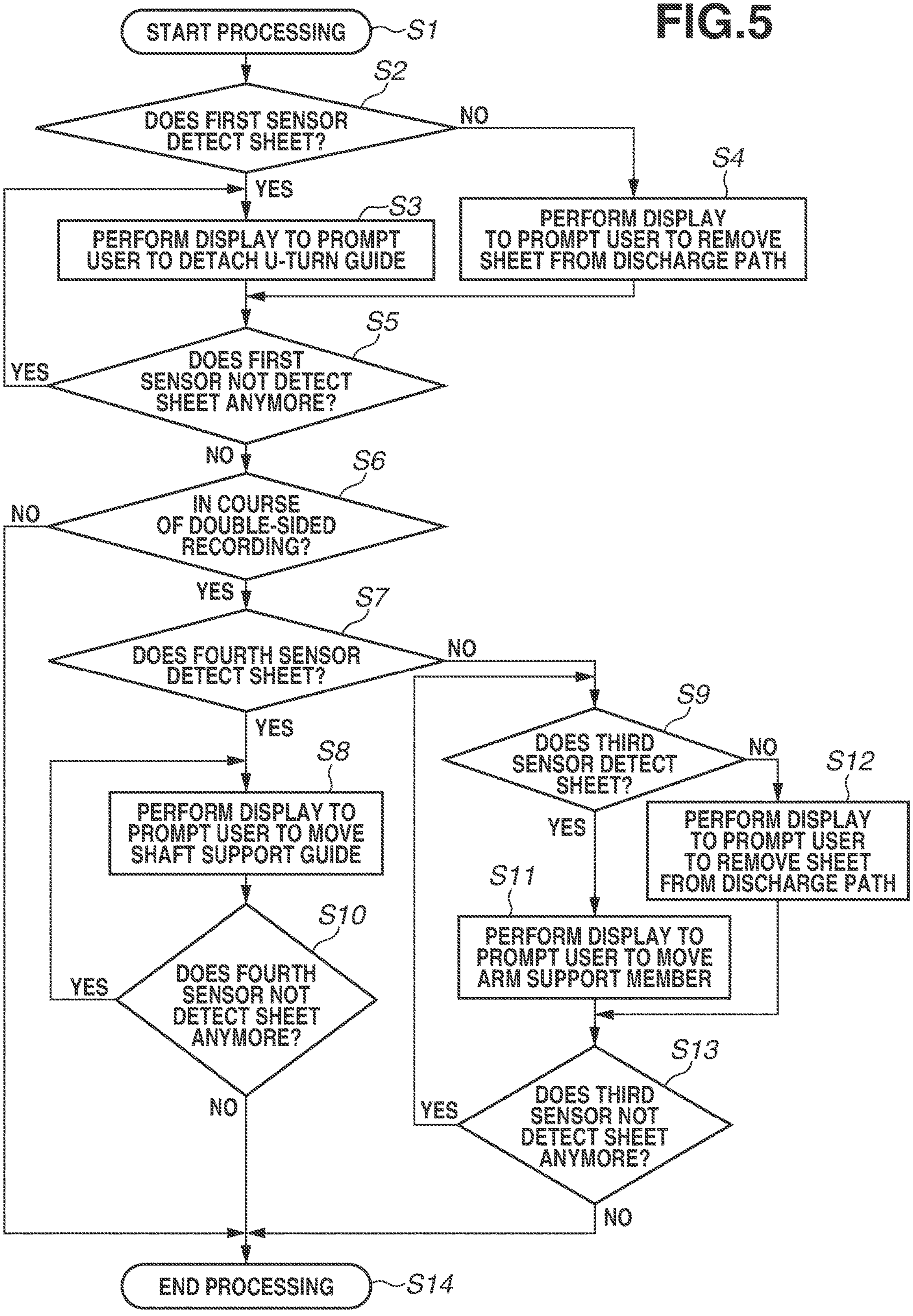
FIG. 5 illustrates a processing sequence for prompting a user to perform an operation to remove a sheet.

If a sheet is jammed in a conveyance path, the CPU 101 displays, on the display device 4, an indication that prompts a user to perform an operation to remove the jammed sheet. The details of the indication vary with the position of the sheet in the conveyance path. FIG. 5 illustrates a processing sequence for prompting the user to perform the operation. The jam of a sheet is detected if the state of the sheet sensor is not changed when the various rollers are driven or if the load on a motor exceeds a threshold, for instance.

In step S1, the CPU 101 starts processing in response to detection of a jam of a sheet.

In step S2, the CPU 101 determines whether the first sensor 31 in the feed path 11 detects the sheet. If the CPU determines that the first sensor 31 detects a sheet (YES in step S2), the processing proceeds to step S3. In step S3, the CPU 101 displays, on the display device 4, an indication that prompts the user to perform an operation to detach a U-turn guide 47 (described below). If the CPU determines that the first sensor 31 does not detect the sheet (NO in step S2), the processing proceeds to step S4. In step S4, the CPU 101 displays, on the display device 4, an indication that prompts the user to remove the sheet from the discharge path 15. The display on the display device 4 is continued until the CPU determines that the first sensor 31 does not detect the sheet in step S5.

In step S6, the CPU 101 determines whether the sheet has been jammed during the double-sided recording of recording an image on both sides of a sheet. If the sheet has been jammed during the double-sided recording (YES in step S6), which indicate that the sheet may be present in the reverse path 14, the processing proceeds to step S7. In step S7, the CPU 101 determines whether the fourth sensor 34 in the reverse path 14 detects a sheet. If the fourth sensor 34 detects a sheet (YES in step S7), which indicates that a sheet is present in the reverse path 14 as in FIG. 4C, the processing proceeds to step S8. If the fourth sensor 34 does not detect the sheet (NO in step S7), the processing proceeds to step S9.

In step S8, the CPU 101 displays, on the display device 4, an indication that prompts the user to move a shaft support guide 46 to be described below and remove the sheet. The indication is displayed until the CPU determines in step S10 that the fourth sensor 34 does not detect a sheet anymore.

In step S9, the CPU 101 determines whether the third sensor 33 detects a sheet. If the third sensor 33 detects a sheet (YES in step S9), which indicates the sheet is located in the reverse path 14 as in the sheet P1 illustrated in FIG. 4B, the processing proceeds to step S11.

In step S11, the CPU 101 displays, on the display device 4, an indication that prompts the user to move an arm support member 45 to be described below. In step S9, if the CPU 101 determines that the third sensor 33 does not detect a sheet (NO in step S9), the processing proceeds to step S12. In step S12, an indication that prompts the user to remove the sheet from the discharge path 15 is displayed on the display device 4. These indications are displayed until the CPU 101 determines in step S13 that the third sensor 33 does not detect a sheet anymore. If the CPU 101 determines that the sheet is no longer detected (NO in step S13), the processing is ended in step S14.

<Configuration of Intermediate Roller Pair>

If a sheet being sandwiched between rollers of an intermediate roller pair is jammed, a user is to separate the rollers of the intermediate roller pair from each other to take out the sheet. In the present exemplary embodiment, the intermediate roller pair includes the intermediate roller 27 and the driven roller 28, and is changed from a first state in which the conveyance of a sheet is performable to a second state in which a sheet is removable, and vice versa. In the first state, the intermediate roller 27 and the driven roller 28 are pressed to each other. In the second state, the intermediate roller 27 is separated from the driven roller 28. The configuration of the intermediate roller pair is described below with reference to FIGS. 6A, 6B, 7A, 7B, and 8.

Figure 6A:
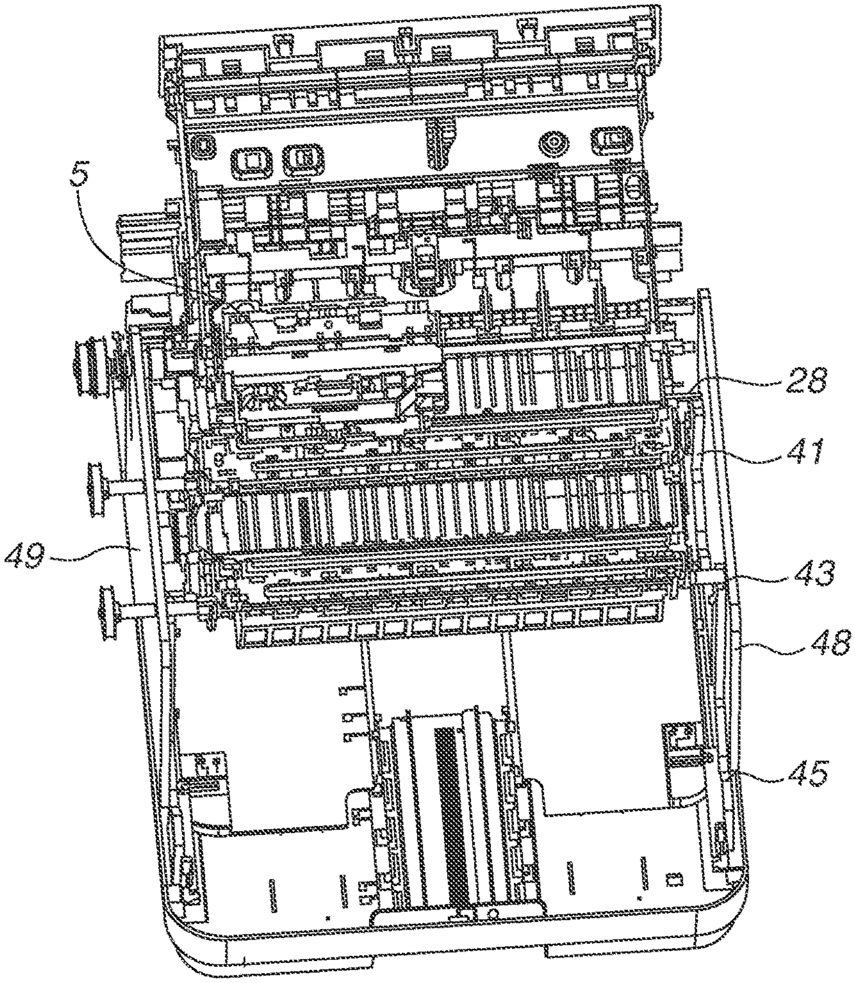
FIGS. 6A and 6B are diagrams illustrating an internal configuration of the recording apparatus.
Figure 6B:
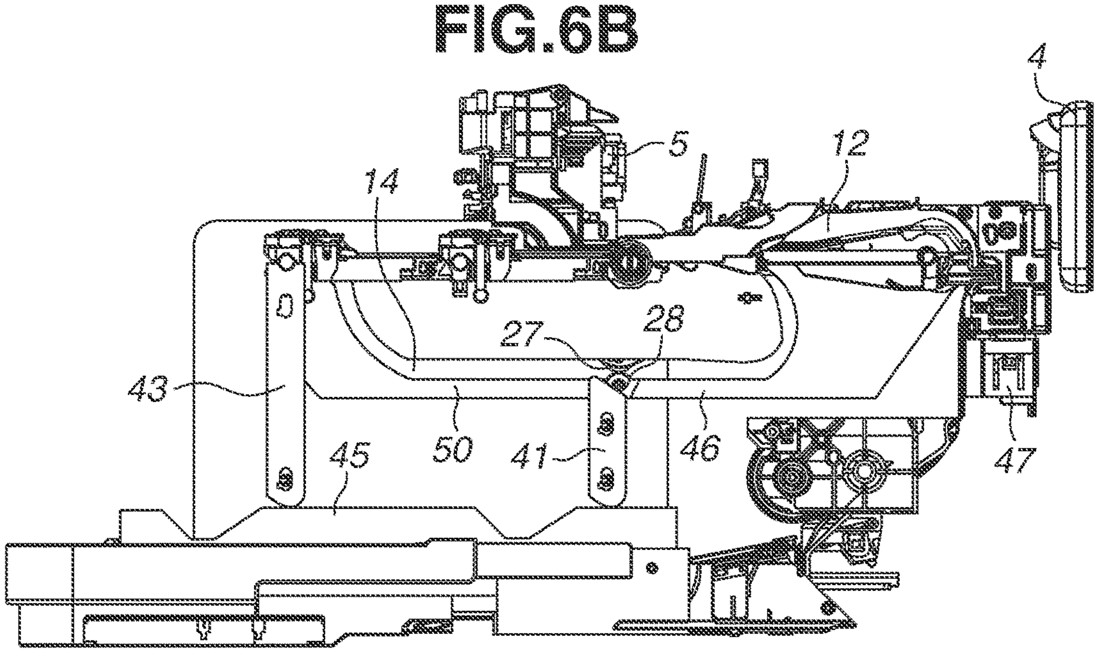

FIGS. 6A and 6B are diagrams illustrating an internal configuration of the recording apparatus 1. FIG. 6A is a perspective view of the recording apparatus 1 as viewed from the rear, and FIG. 6B is a sectional view of the recording apparatus 1, illustrating a section from the front to the rear. The recording apparatus 1 has a side panel 48 and a side panel 49 provided on one side and the other side in a sheet width direction, respectively. Sheets are conveyed between the side panel 48 and the side panel 49. A rotating shaft 28*a* of the driven roller 28 passes through movement regulation holes (48*a* and 49*a*) provided in the side panels 48 and 49, respectively. In this example, either the side panel 48 or the side panel 49 is only described as appropriate.

In the first state in which the conveyance of a sheet is performable, the rotating shaft 28*a* of the driven roller 28 is supported from below in a vertical direction in a V-shaped groove formed with an upper slant face 41*a* of a shaft support arm 41 and a lateral slant face 46*a* of the shaft support guide 46. At this time, the rotating shaft 28*a* in the movement regulation hole 48*a* is not in contact with the side panel 48. The shaft support arm 41 and the shaft support guide 46 are movable members that move in different directions. The shaft support arm 41 or the shaft support guide 46 serving as a movable member is moved, which brings about the second state, in which the rollers of the intermediate roller pair are separated.

Thus, the shaft support arm 41 and the shaft support guide 46 serve as a switching unit with which the first state and the second state are switched. An upper face of the shaft support guide 46 and an upper face of a reverse path guide 50 form part of the reverse path 14. The reverse path guide 50 is fixed, while the shaft support guide 46 is movable in a direction in which the shaft support guide 46 moves away from the reverse path guide 50.

The operation to detach the U-turn guide 47 in step S3 as above is carried out by tilting the display device 4 and moving the U-turn guide 47 toward the front of the recording apparatus 1. The operation of detaching the shaft support guide 46 in step S8 is carried out by detaching the U-turn guide 47 and then moving the shaft support guide 46 in the same direction as the direction in which the U-turn guide 47 is moved for detachment. The arm support member 45 is formed integrally with the loading unit 9, and is movable toward the front of the recording apparatus 1 along with the loading unit 9. The arm support member 45 may be movable toward the rear of the recording apparatus 1. In this case, the jammed sheet is removed from multiple directions.

Figure 7A:
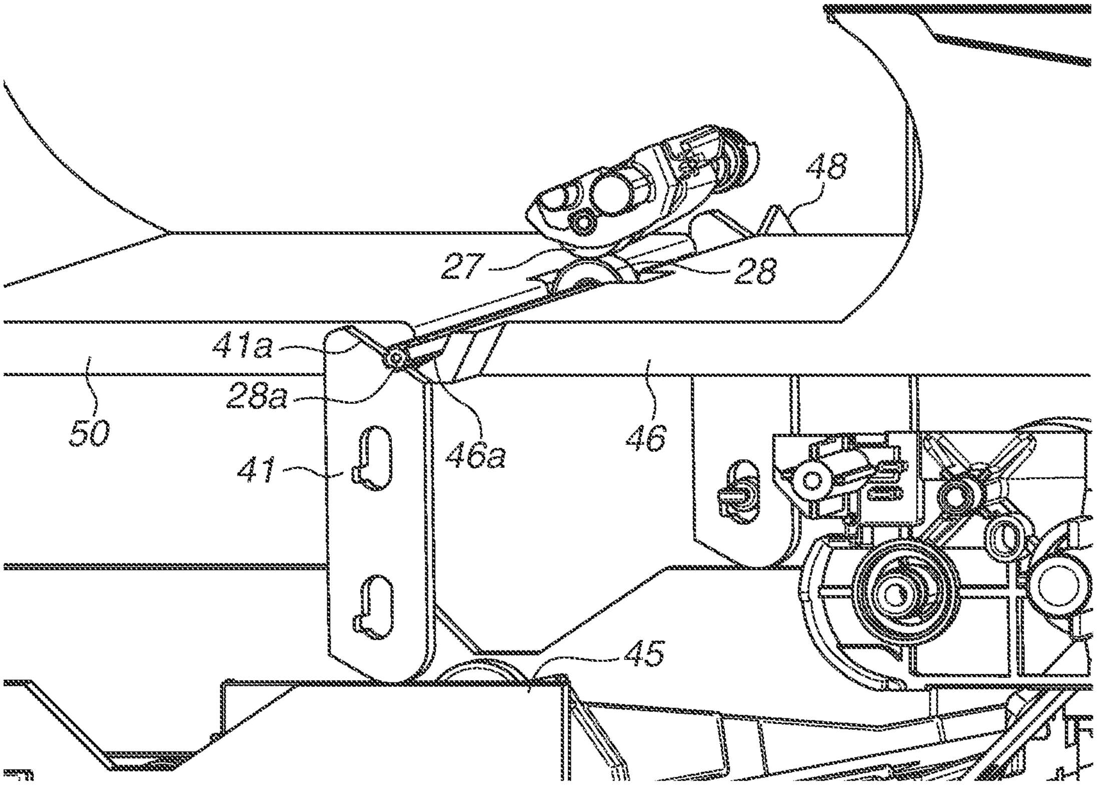
FIGS. 7A and 7B are diagrams illustrating a support structure for a rotating shaft of a driven roller.
Figure 7B:
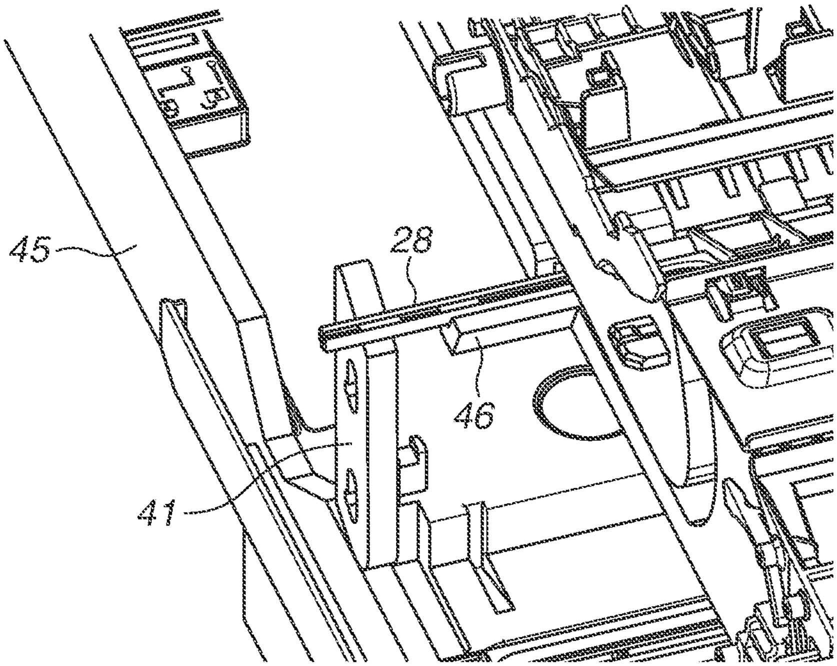

FIGS. 7A and 7B are diagrams illustrating a support structure for the rotating shaft 28*a* of the driven roller 28. The rotating shaft 28*a* of the driven roller 28 is supported by shaft support arms (41 and 42) arranged on both end sides in the sheet width direction and the shaft support guide 46, at different positions in an axial direction. The rotating shaft 28*a* of the driven roller 28 is thinned except for the portions to be supported by the shaft support arms (41 and 42) and the shaft support guide 46, to reduce the weight.

Figure 8:
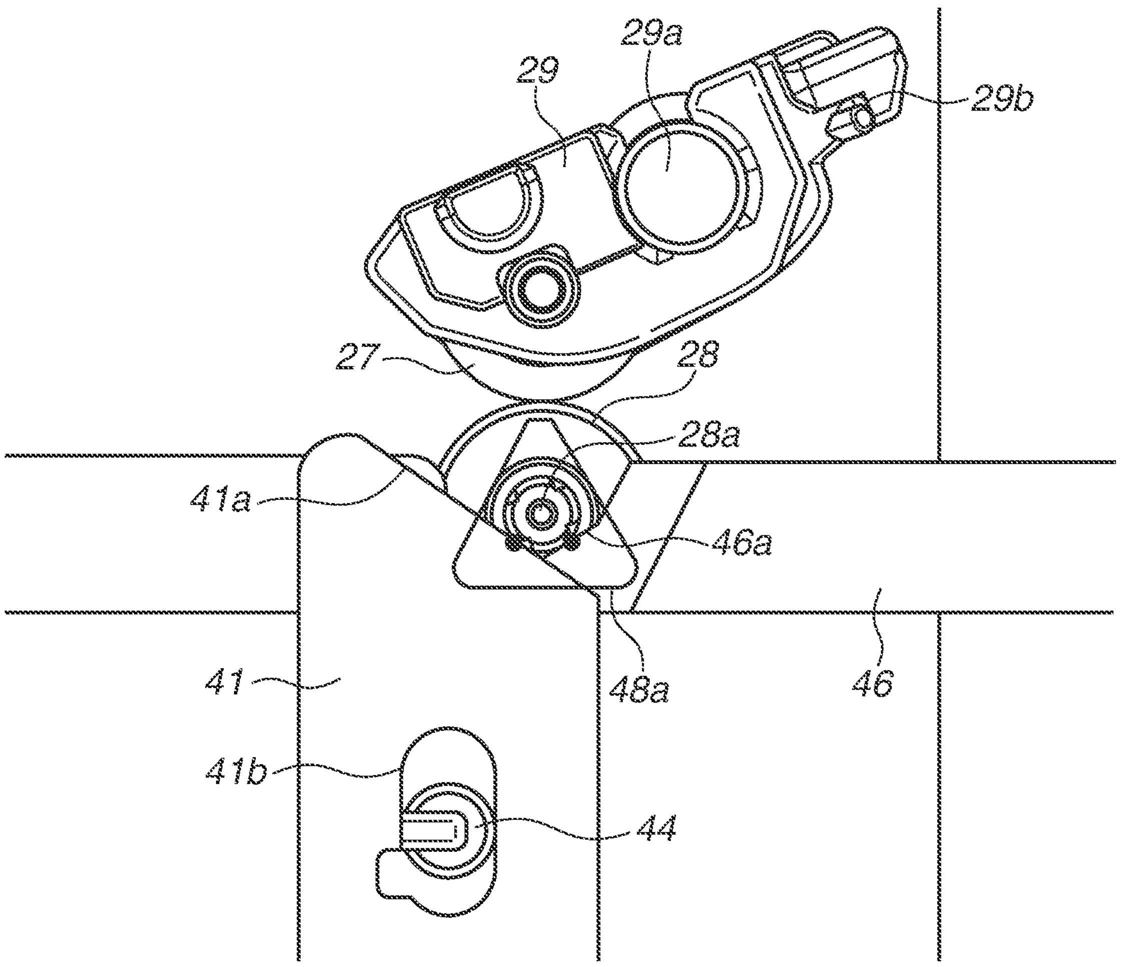
FIG. 8 is a diagram illustrating a configuration of an intermediate roller pair.

FIG. 8 is a diagram illustrating details of the support structure for the rotating shaft 28*a* of the driven roller 28. The movement regulation hole 48*a* is projected on a sectional view. The rotating shaft 28*a* of the driven roller 28 is supported from below in the vertical direction by the upper slant face 41*a* of the shaft support arm 41 and the lateral slant face 46*a* of the shaft support guide 46. A roller holding member 29 uses a spring (not illustrated) to urge a rotating shaft 29*a* toward a center of rotation, an end portion 29*b* upward in the vertical direction, and the intermediate roller 27 downward in the vertical direction. Thus, the driven roller 28 is pressed by the intermediate roller 27 if lifted up in the vertical direction. In other words, the intermediate roller 27 is supported by the driven roller 28. Consequently, a sheet is sandwiched between the intermediate roller 27 and the driven roller 28 and conveyed by the rotation of the intermediate roller 27.

Figure 9A:
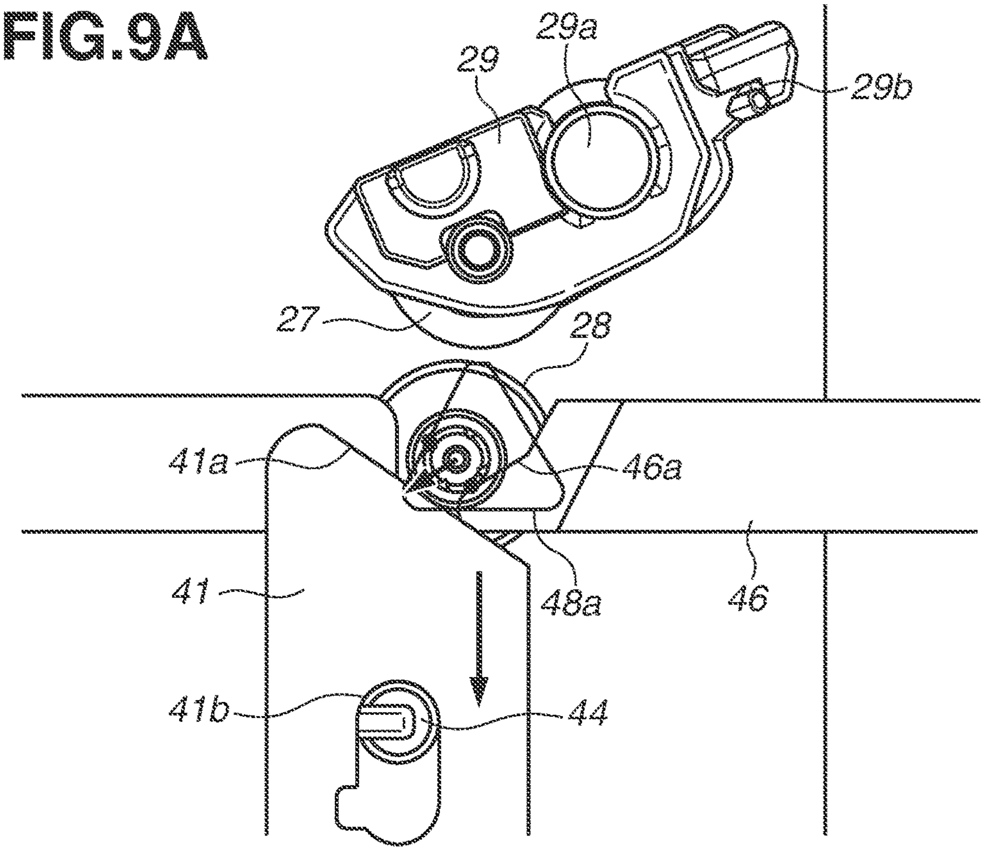
FIGS. 9A and 9B are diagrams illustrating a state where rollers of the intermediate roller pair are separated from each other.
Figure 9B:
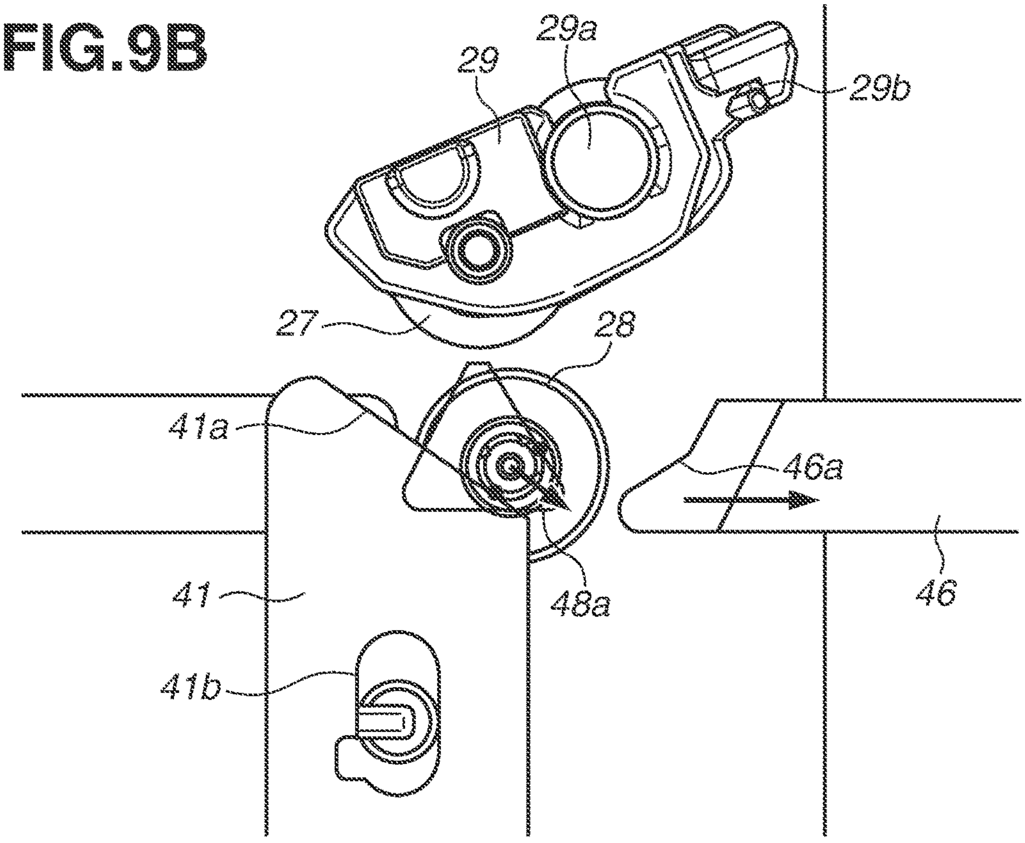

FIGS. 9A and 9B illustrate the second state, in which the rollers of the intermediate roller pair are separated. In the second state, a sheet cannot be conveyed because the rollers of the intermediate roller pair are separated. A position at which the rotating shaft 28*a* of the driven roller 28 is in contact with a different member and is supported is indicated with a black dot. An arrow indicates a direction in which the rotating shaft 28*a* of the driven roller 28, the shaft support arm 41 or the shaft support guide 46 has moved. FIG. 9A illustrates a state where the shaft support arm 41 is moving downward. If the arm support member 45 is moved from a position in the first state in FIG. 8, the shaft support arm 41 moves downward in the vertical direction. As a result, the rotating shaft 28*a* of the driven roller 28 moves downward along the lateral slant face 46*a* of the shaft support guide 46 and, in the movement regulation hole 48*a*, comes into contact with the side panel 48 to stop. At this time, the driven roller 28 is moved downward in the vertical direction, so that the intermediate roller pair is brought into the second state, in which the driven roller 28 is separated from the intermediate roller 27. A conveyance path from the conveyance path 13 to the intermediate roller pair in the reverse path 14 is opened as described below, so that a sheet is removable. Thus, the moving of the shaft support guide 46, which is a movable member in the switching unit, enables the state of the intermediate roller pair to be switched between the first state to the second state.

FIG. 9B illustrates a state where the shaft support guide 46 is moving toward the front. If the shaft support guide 46 is moved from a position in the first state toward the front of the recording apparatus 1, the rotating shaft 28*a* of the driven roller 28 moves downward along the upper slant face 41*a* of the shaft support arm 41. As a result, in the movement regulation hole 48*a* in the side panel 48, the rotating shaft 28*a* comes into contact with the side panel 48 to stop. At this time, the driven roller 28 is moving downward in the vertical direction, so that the intermediate roller pair is brought into the second state, in which the driven roller 28 is separated from the intermediate roller 27. The U-turn guide 47 has been moved, so that a conveyance path from the intermediate roller pair in the reverse path 14 to the junction 16 is opened. Thus, the moving of the shaft support arm 41, which is a movable member in the switching unit is moved, enables the state of the intermediate roller pair to be switched between the first state and the second state.

In the present exemplary embodiment, the reverse path guide 50 is fixed and the shaft support arm 41 is moved in the vertical direction. Alternatively, a member or portion corresponding to the upper slant face 41*a* of the shaft support arm 41 may be provided on the reverse path guide 50. In the first state, the rotating shaft 28*a* is supported on the slant face of the reverse path guide 50 and the lateral slant face 46*a*. The reverse path guide 50 is moved toward the rear of the recording apparatus 1, that is to say, moved opposite to the shaft support guide 46, so that the intermediate roller pair is brought into the second state. Such configuration allows a user to remove the sheet from multiple directions.

The slant faces 41*a* and 46*a* of the shaft support arm 41 and the shaft support guide 46 each have a lower end located lower in the vertical direction than a position at which the shaft 28*a* of the intermediate driven roller 28 is stopped from moving down by the movement regulation hole 48*a* of the side panel 48. The position and shape of the reverse path guide 50 do not interfere with the movement of the driven roller 28 and attendant members.

When the shaft support arm 41 and the shaft support guide 46 are returned to original positions, the rotating shaft 28*a* of the driven roller 28 is lifted up by the upper slant face 41*a* or the lateral slant face 46*a*. At this time, the driven roller 28 supports the intermediate roller 27, so that the intermediate roller pair is brought into the first state in which the conveyance of a sheet is performable. The shaft support arm 41 has a range of movement in the vertical direction that is regulated by an elongated hole 41*b* provided at a lateral face of the shaft support arm 41 and a boss 44 of the side panel 48.

Figure 10A:
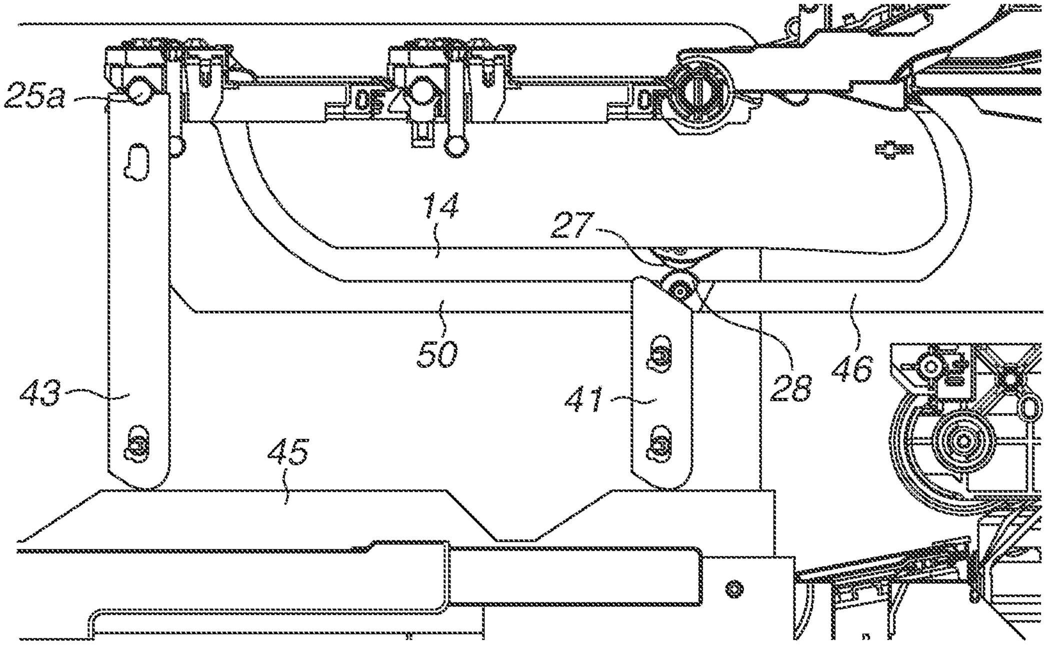
FIGS. 10A and 10B are diagrams illustrating change in state of an intermediate roller and a reverse roller.
Figure 10B:
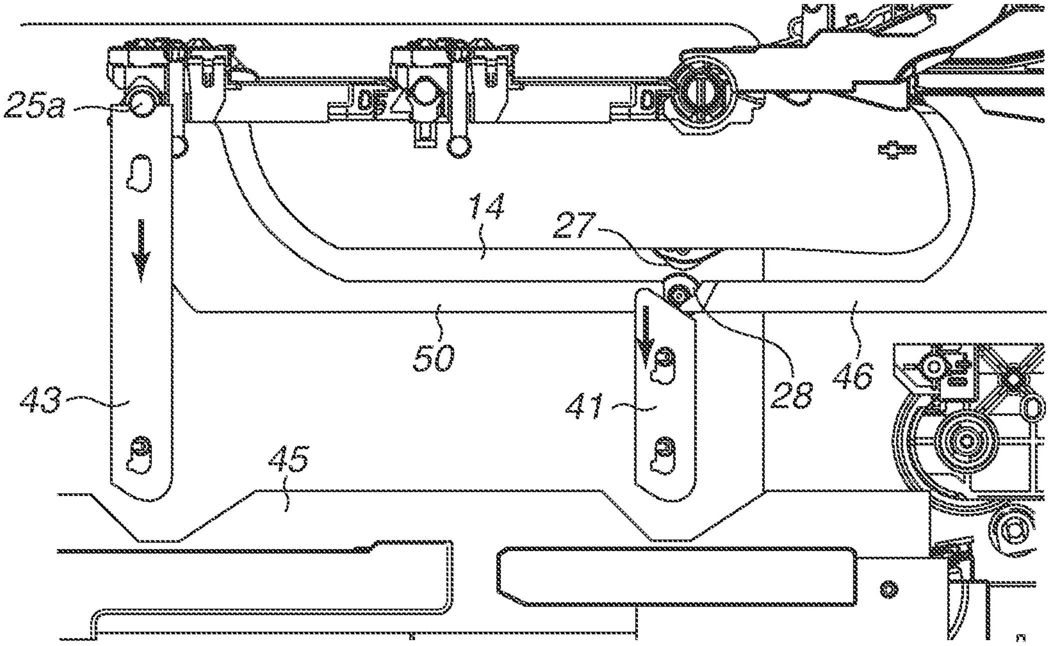

FIGS. 10A and 10B illustrate the change in state of the intermediate roller pair and a reverse roller pair. The intermediate roller pair is supported by the shaft support arm 41 and the shaft support guide 46, and the reverse roller pair is supported by a shaft support arm 43. Lower faces of the shaft support arm 41 and the shaft support arm 43 are each supported on an upper face of the arm support member 45. The upper slant face 41*a* of the shaft support arm 41 supports the rotating shaft 28*a* of the driven roller 28. An upper portion of the shaft support arm 43 supports a rotating shaft 25*a* of the reverse roller 25. The upper face of the arm support member 45 is in the shape of cams each supporting the shaft support arm 41 and the shaft support arm 43, and the arm support member 45 is moved in the X direction, thus moving the shaft support arm 41 and the shaft support arm 43 up and down. The arm support member 45 is integral with a member of the loading unit 9. The shaft support arm 43 moves in the vertical direction as the arm support member 45 moves, thus switching between a pressed state and a separated state of the reverse roller 25 and a reverse driven roller 26. A state where the reverse roller 25 and the reverse driven roller 26 are pressed to each other is the first state, in which a sheet is conveyable by driving the reverse roller 25. A state where the reverse roller 25 and the reverse driven roller 26 are separated is the second state, in which a sheet is removable. Thus, if a sheet is sandwiched between the reverse roller pair and the intermediate roller pair, a user can remove the sheet by moving the arm support member 45. The shaft support arm 43 has a range of movement in the vertical direction that is regulated by an elongated hole provided at a lateral face of the shaft support arm 43 and a boss of the side panel 48.

The present exemplary embodiment may be applicable not only for the configuration where the first state and the second state of the intermediate roller pair is switched but a configuration where the first state and the second state of the main conveyance rollers 21 or the discharge rollers 22 is switched. Two movable members that move in different directions are sufficient to remove a sheet according to the position of the sheet in a conveyance path. The shaft support guide 46 does not need to be limited to a member of the reverse path 14.

As described above, a recording apparatus that uses multiple members to separate rollers of a roller pair from each other is provided.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-047588, filed Mar. 23, 2022, which is hereby incorporated by reference herein in its entirety.

What is claimed is:

1. A recording apparatus configured to record an image on a sheet, the recording apparatus comprising:

a roller pair configured to sandwich the sheet between the roller pair to convey the sheet, the roller pair including a first roller and a second roller that is arranged below the first roller; and a switching unit configured to switch between a first state in which the roller pair sandwiches the sheet and a second state in which rollers of the roller pair are separated from each other, wherein the switching unit includes a first movable member configured to be moved in a first direction so that the first state is switched to the second state, and a second movable member configured to be moved in a second direction different from the first direction so that the first state is switched to the second state, and wherein the first movable member and the second movable member support a rotating shaft of the second roller in the first state.

2. The recording apparatus according to claim 1, further comprising a side panel through which the rotating shaft passes, wherein the side panel is out of contact with the rotating shaft in the first state and in contact with the rotating shaft in the second state.

3. The recording apparatus according to claim 1, further comprising a recording unit, wherein the roller pair is arranged in a reverse path for returning the sheet on which the image has been recorded to the recording unit.

4. The recording apparatus according to claim 3, further comprising:

a first conveyance path for conveying the sheet toward the recording unit; and a second conveyance path for conveying the sheet having been subjected to recording with the recording unit, wherein the reverse path connects the second conveyance path and the first conveyance path.

5. The recording apparatus according to claim 4, further comprising a reverse roller pair arranged in the second conveyance path, wherein the reverse roller pair sandwiches the sheet between the reverse roller pair in the first state, and rollers of the reverse roller pair are separated from each other in the second state.

6. The recording apparatus according to claim 4, wherein the second conveyance path is connected to a discharge path that discharges the sheet on which the image has been recorded.

7. The recording apparatus according to claim 1, further comprising a conveyance path including a first guide that is movable and is configured to support the sheet and a second guide that is fixed and is configured to support the sheet, wherein the first movable member is provided on the first guide.

8. The recording apparatus according to claim 1, further comprising a support member configured to move to a position at which the second movable member is supported and to a position at which the second movable member is not supported.

9. The recording apparatus according to claim 8, wherein the support member is configured to move along with a loading unit in which a sheet on which an image is to be recorded is loaded.

* * * * *